United States Patent
Pei et al.

(10) Patent No.: US 10,768,323 B2
(45) Date of Patent: Sep. 8, 2020

(54) METHODS AND SYSTEMS FOR SEISMIC DATA ANALYSIS USING A TILTED TRANSVERSELY ISOTROPIC (TTI) MODEL

(71) Applicant: HALLIBURTON ENERGY SERVICES, INC., Houston, TX (US)

(72) Inventors: Donghong Pei, Houston, TX (US); Robert Jason Gibbs, Pearland, TX (US); Ran Zhou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 135 days.

(21) Appl. No.: 14/760,142

(22) PCT Filed: Jun. 18, 2013

(86) PCT No.: PCT/US2013/046269
§ 371 (c)(1),
(2) Date: Jul. 9, 2015

(87) PCT Pub. No.: WO2014/204440
PCT Pub. Date: Dec. 24, 2014

(65) Prior Publication Data
US 2016/0091622 A1    Mar. 31, 2016

(51) Int. Cl.
*G01V 1/30* (2006.01)
*G01V 1/28* (2006.01)
*G01V 1/34* (2006.01)
*G01V 1/40* (2006.01)

(52) U.S. Cl.
CPC .............. *G01V 1/306* (2013.01); *G01V 1/28* (2013.01); *G01V 1/282* (2013.01); *G01V 1/34* (2013.01);
(Continued)

(58) Field of Classification Search
CPC .......... G01V 1/306; G01V 1/28; G01V 1/282; G01V 1/34; G01V 1/40
See application file for complete search history.

(56) References Cited

U.S. PATENT DOCUMENTS

| 5,740,124 | A | * | 4/1998 | Chunduru | ............... G01V 1/46 367/25 |
| 5,889,729 | A | * | 3/1999 | Frenkel | .................... G01V 3/20 367/73 |

(Continued)

FOREIGN PATENT DOCUMENTS

WO    2014/204440    12/2014

OTHER PUBLICATIONS

"AU Patent Examination Report", Dated Jun. 7, 2016, Appl No. 2013392659, "Methods and Systems for Seismic Data Analysis Using a Tilted Transversely Isotropic (TTI) Model," Filed Jun. 18, 2013, 3 pgs.

(Continued)

*Primary Examiner* — Changhyun Yi
(74) *Attorney, Agent, or Firm* — John Wustenberg; Parker Justiss, P.C.

(57) ABSTRACT

At least some of the disclosed systems and methods employ one or more seismic receivers that gather seismic data from a plurality of positions in a borehole that penetrates a formation. Further, at least some of the disclosed systems and methods employ a memory to store the gathered seismic data. Further, at least some of the disclosed systems and methods employ logic that inverts the seismic data for simultaneous determination of asymmetric axis velocity ($V_0$) and Thomsen parameters, epsilon ($\epsilon$) and delta ($\delta$), in a tilted transversely isotropic (TTI) model.

16 Claims, 9 Drawing Sheets

(52) U.S. Cl.
CPC .......... *G01V 1/40* (2013.01); *G01V 2210/624* (2013.01); *G01V 2210/626* (2013.01)

(56) References Cited

U.S. PATENT DOCUMENTS

| | | |
|---|---|---|
| 2008/0172180 A1 | 7/2008 | Garotta |
| 2010/0135115 A1* | 6/2010 | Sun .................. G01V 1/303 367/75 |
| 2011/0007604 A1* | 1/2011 | Liu .................... G01V 1/28 367/52 |
| 2011/0264421 A1 | 10/2011 | Jing et al. |

OTHER PUBLICATIONS

"Extended EP Search Report", dated Jan. 20, 2017, Appl No. 13887093.6, "Methods and Systems for Seismic Data Analysis Using a Tilted Transversely Isotropic (TTI) Model," 10 pgs.

"GCC Examination Report", dated Mar. 28, 2017, Appl No. 27126, "Methods and Systems for Seismic Data Analysis Using a Tilted Transversely Isotropic (TTI) Model," Filed May 8, 2014, 4 pgs.

Ingber, L., "Very Fast Simulated Re-Annealing", Ingber, L., "Very Fast Simulated Re-Annealing," Mathl Comput. Modelling, 1989, p. 967-973, vol. 12, No. 8, 7 pgs.

Nadri, Dariush et al., "Estimation of stress-depending anisotropy from P-wave measurements on a spherical sample", Geophysics, May-Jun. 2011, p. WA91-WA100, vol. 76, No. 3, Society of Exploration Geophysicists, 10 pgs.

PCT International Search Report and Written Opinion, dated Aug. 29, 2013, Appl No. PCT/US2013/046269, Methods and Systems for Seismic Data Analysis Using a Tilted Transversely Isotropic (TTI) Model, filed Jun. 18, 2013, 13 pgs.

* cited by examiner

Seismic wave reflection at layer
boundary of anisotropic media

Seismic wave transmission at layer
boundary of anisotropic media

METHODS AND SYSTEMS FOR SEISMIC DATA ANALYSIS USING A TILTED TRANSVERSELY ISOTROPIC (TTI) MODEL

BACKGROUND

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbon reservoirs and/or veins. Most oil companies rely on exploration seismology to select sites in which to drill exploratory oil wells.

Traditional seismology employs artificially generated seismic waves to map subsurface structures. The seismic waves propagate from a source down into the earth and reflect from boundaries between subsurface structures. Surface receivers and/or sub-surface receivers detect and record direct or reflected seismic waves for later analysis. Though some large-scale structures can often be perceived from a direct examination of the recorded signals, generally the recorded signals are processed to remove distortion and reveal finer detail in the subsurface image.

When sedimentation and tectonic processes produce dip and layer thickness variations in anisotropic media, their velocity structures may be approximated as Tilted Transversely Isotropic (TTI) that induces a directional dependence on wave propagation. For example, in thrust belts such as the Canadian foothills reservoirs, thick sequences of dipping sandstone and shale layers generate a tilted symmetry axis. Also, in some salt domes (e.g., in the Gulf of Mexico area), the strata around the salt flank are tilted by the movement of the salt. Accurate analysis of seismic data for anisotropic media is not a trivial task.

One example seismology technique, known as walk-away vertical seismic profile (VSP) survey, determines the response of receivers in a borehole to excitation by at least one seismic source located at various distances from the well-bore. However, the results are often affected by seismic anisotropy. The determination of anisotropic parameters from surface seismic data is often difficult, due to relatively poor data quality and the relatively low frequencies at which the measurements are made.

BRIEF DESCRIPTION OF THE DRAWINGS

A better understanding of the various disclosed embodiments can be obtained when the following detailed description is considered in conjunction with the attached drawings, in which.

Figure 1:
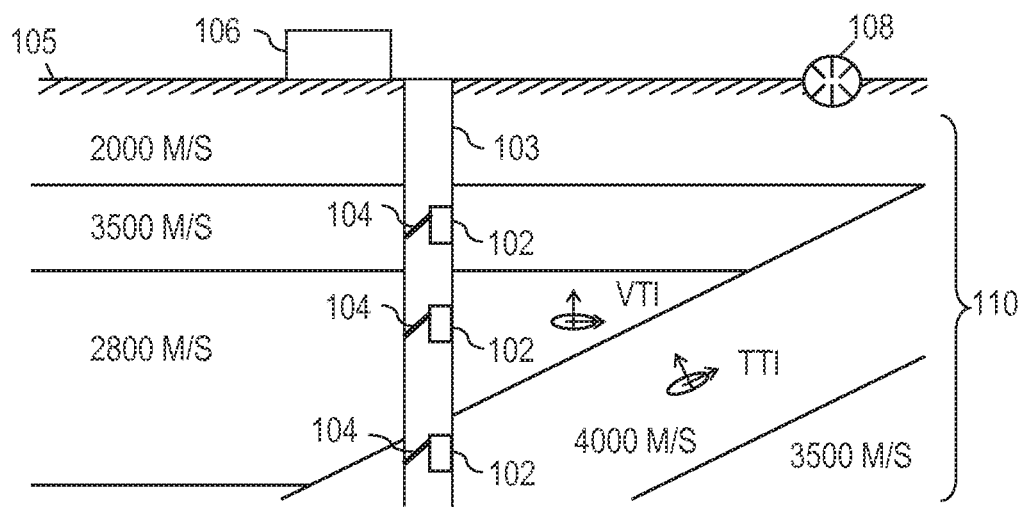
FIG. 1 shows an illustrative seismic survey environment.

While the invention is susceptible to various modifications and alternative forms, specific embodiments thereof are shown by way of example in the drawings and will herein be described in detail. It should be understood, however, that the drawings and detailed description are not intended to limit the disclosed embodiments to the particular forms shown, but on the contrary, the intention is to cover all modifications, equivalents and alternatives falling within the scope of the appended claims.

DETAILED DESCRIPTION

A two-dimensional (2D) layered P-wave velocity model in Tilted Transversely Isotropic (TTI) media includes multiple layers, where each layer is specified by five parameters: the layer depth, the anisotropic symmetry axis angle from the vertical direction, the velocity ($V_0$) along the direction of the anisotropic symmetry axis, and Thomsen parameters epsilon ($\varepsilon$) and delta ($\delta$). The layer depth and the anisotropic symmetry axis angle may be defined by surface seismic velocity analysis. Meanwhile, the other parameters ($V_0$, $\varepsilon$, $\delta$) are estimated using VSP check-shot and walkaway surveys.

For a Vertically Transverse Isotropy (VTI) media, the VSP check-shot velocity profile is an adequate approximation for $V_0$ as it represents the vertical interval velocity near the wellbore. However, for TTI media where anisotropic symmetry axes usually are deviated from the vertical line, directly using check-shot velocity as $V_0$ can lead to substantial errors in the estimated anisotropic parameters.

In at least some embodiments, the disclosed systems and methods perform simultaneous inversion of $V_0$ and the Thomsen parameters, $\varepsilon$ and $\delta$. More specifically, optimal values for $V_0$, $\varepsilon$, and $\delta$ are determined for a reservoir TTI model by minimizing the difference between first arrival picks and the calculated first arrival times using VSP walkaway data. The first arrival pick is the observed direct arrival travel time from a seismic source to a geophone placed in a wellbore. The seismic data produced by VSP walkaway surveys are processed to yield a high-quality seismic section. The first arrival times are picked from the seismic section. In at least some embodiments, the calculated first arrival time is the numerically calculated travel time from a seismic source to a geophone through a TTI velocity model. As disclosed herein, a Very Fast Simulated Annealing (VFSA) method may be employed to simultaneously invert $V_0$ and the Thomsen parameters, $\varepsilon$ and $\delta$. The VFSA technique is exponentially faster than traditional simulated annealing and, in some cases, superior to evolutionary methods or genetic algorithms. Once a final TTI velocity model has been determined using the disclosed techniques, the TTI model may be used along with a structural model to derive formation properties and/or formation images from collected seismic data.

The disclosed systems and methods are best understood when described in an illustrative usage context. Accordingly, FIG. 1 shows an illustrative seismic survey environment, in which seismic receivers 102 are in a spaced-apart arrangement within a borehole 103 to detect seismic waves. As shown, the receivers 102 may be fixed in place by anchors 104 to facilitate sensing seismic waves. In different embodiments, the receivers 102 may be part of a logging-while-drilling (LWD) tool string or wireline logging tool string. Further, the receivers 102 communicate wirelessly or via cable to a data acquisition unit 106 at the surface 105, where the data acquisition unit 106 receives, processes, and stores seismic signal data collected by the receivers 102. To generate seismic signal data, surveyors trigger a seismic energy source 108 (e.g., a vibrator truck) at one or more positions to generate seismic energy waves that propagate through the earth 110. Such waves reflect from acoustic impedance discontinuities to reach the receivers 102. Illustrative discontinuities include faults, boundaries between formation beds, and boundaries between formation fluids. The discontinuities may appear as bright spots in the subsurface structure representation that is derived from the seismic signal data.

FIG. 1 further shows an illustrative subsurface model. In this model, the earth has three relatively flat formation layers and two dipping formation layers of varying composition and hence varying speeds of seismic waves. Within each formation, the speed of seismic waves can be isotropic (i.e., the same in every direction) or anisotropic. Due to the manner in which rocks are formed, nearly all anisotropic formations are transversely isotropic. In other words the speed of seismic waves in anisotropic formations is the same in every "horizontal" direction, but is different for seismic waves traveling in the "vertical" direction. Note, however, that geological activity can change formation orientations, turning a VTI formation into a TTI formulation. In FIG. 1, the third flat layer is VTI, while the first dipping formation layer is TTI. In at least some embodiments, the analysis of seismic data collected by sensors 102 involves simultaneous inversion of $V_0$ and the Thomsen parameters, $\varepsilon$ and $\delta$, using a VFSA technique as described herein.

Figure 2:
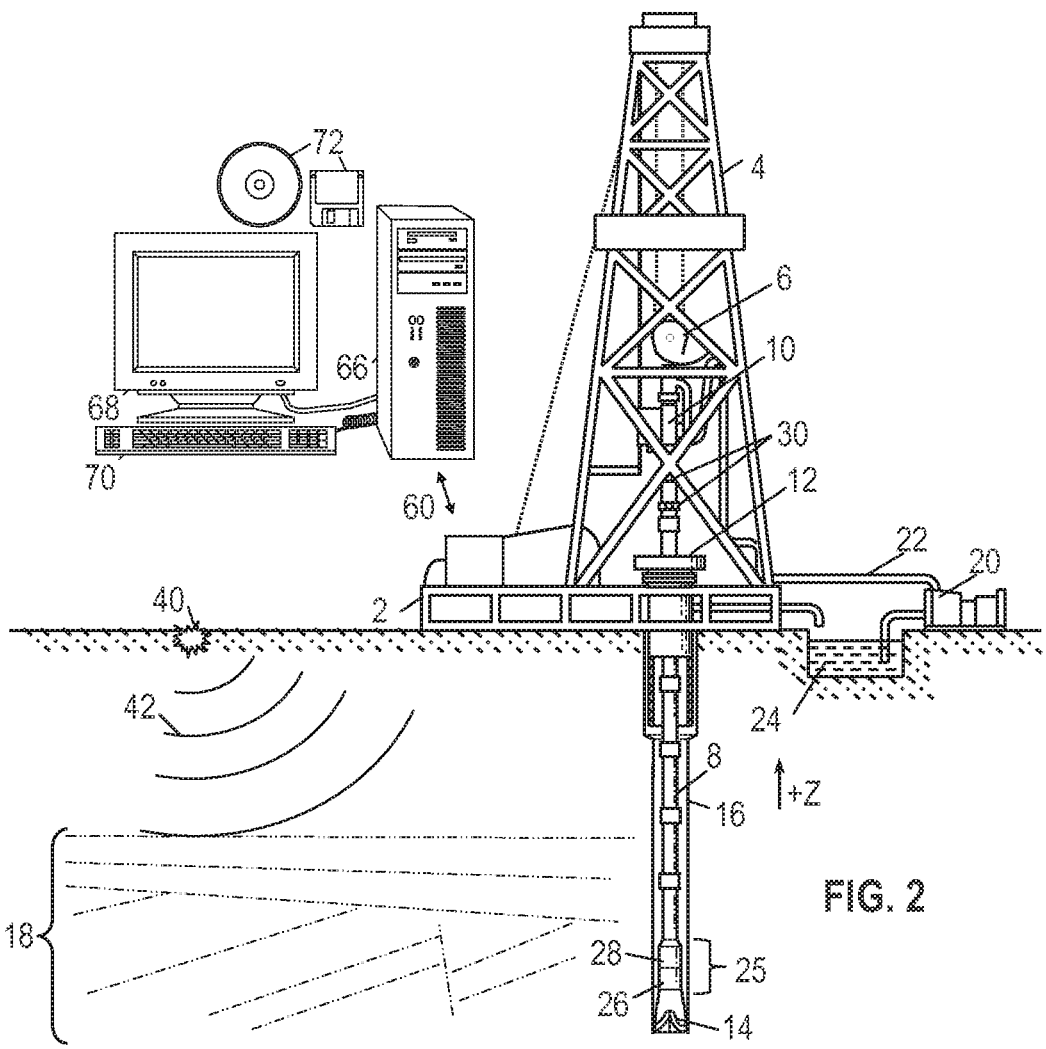
FIG. 2 shows an illustrative seismic while drilling (SWD) environment.

FIG. 2 shows an illustrative seismic while drilling (SWD) environment in which a drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole 16 into the pit 24 and aids in maintaining the integrity of the borehole 16.

A logging tool suite 26 is integrated into a bottomhole assembly 25 near the bit 14. As the bit 14 extends the borehole 16 through the formations, the tool suite 26 collects measurements relating to various formation properties as well as the tool orientation and various other drilling conditions. During pauses in the drilling process (e.g., when the drill string 8 is extended by the addition of an additional length of tubing), the tool suite 26 collects seismic measurements. As the pump 20 is normally off during this extension process, the downhole environment is generally quiet during these pauses. The bottomhole assembly 25 can be configured to automatically detect such pauses and to initiate a programmable time window for recording any received seismic waveforms.

At predetermined time intervals, a seismic source 40, e.g., a surface vibrator or an air gun, is triggered to create a "shot", i.e., a burst of seismic energy that propagates as seismic S-waves and/or P-waves 42 into the subsurface. Such waves undergo partial transmission, reflection, refraction, and mode transformation at acoustic impedance changes such as those caused by bed boundaries, fluid interfaces, and faults. The tool suite 26 includes seismic sensors to detect the modified seismic waves reaching the bottomhole assembly 25. Data is recorded in downhole memory when each shot is fired on the surface. The tool suite 26 (and the other system components) has a high-accuracy clock to ensure that the recorded measurements' timing can be synchronized to the timing of the shot. One possible synchronization approach is to synchronize a bottomhole assembly clock to the clock information in the Global Positioning System (GPS) prior to insertion into the borehole 16.

The tool suite 26 may take the form of one or more drill collars, i.e., a thick-walled tubulars that provide weight and rigidity to aid the drilling process. The tool suite 26 further includes a navigational sensor package having directional sensors for determining the inclination angle, the horizontal angle, and the rotational angle (a.k.a. "tool face angle") of the bottomhole assembly 25. As is commonly defined in the art, the inclination angle is the deviation from vertically downward, the horizontal angle is the angle in a horizontal plane from true North, and the tool face angle is the orientation (rotational about the tool axis) angle from a high side (i.e., the side closest to earth's surface) of the borehole 16. Directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottomhole assembly 25 can be determined. Additionally, a three axis magnetometer measures the earth's magnetic field vector in a similar manner. From the combined magnetometer and accelerometer data, the horizontal angle of the bottomhole assembly 25 may be determined. Inertial and gyroscopic sensors are also suitable and useful for tracking the position and orientation of the seismic sensors.

A telemetry sub 28 (e.g., a mud pulse, electromagnetic, or wired pipe arrangement) is included to transfer measurement data to a surface receiver 30 and to receive commands from the surface. As an example, the telemetry sub 28 may operate by modulating the flow of drilling fluid to create pressure pulses that propagate along the fluid column between the bottomhole assembly 25 and the surface. (Mud pulse telemetry generally requires a flow of drilling fluid and thus is not performed while the pump is off.)

The telemetry receiver(s) 30 are coupled to a data acquisition system that digitizes the receive signal and communicates it to a surface computer system 66 via a wired or wireless link 60. The link 60 can also support the transmission of commands and configuration information from the computer system 66 to the bottomhole assembly 25. Surface computer system 66 is configured by software (shown in FIG. 1 in the form of removable storage media 72) to monitor and control downhole instruments 26, 28. System 66 includes a display device 68 and a user-input device 70 to enable a human operator to interact with the system control software 72.

Thus SWD systems can be broadly partitioned into two components: a surface system and a downhole system that work in a synchronized fashion. The surface system may include an acoustic source 40 and at least a single processing unit 66 typically executing microcode to control the actuation of the acoustic source. Other embodiments may involve dedicated hardware to control the actuation of the acoustic source 40. Often the acoustic source 40 may be an air-gun or a seismic vibrator (e.g. Vibroseis) possibly fired/vibrated within predetermined time intervals. They operate to excite an acoustic signal that propagates through rock formations to the downhole systems. For offshore operations, the acoustic signal may propagate through water in addition to a rock formation.

The downhole SWD component may be a part of a Logging While Drilling (LWD) or Measurement While Drilling (MWD) subsystem used in providing L/MWD services, respectively. The teachings herein may also apply to wireline services, in which the downhole component is part of a wireline logging sonde. An illustrative Logging While Drilling (LWD) downhole system providing SWD services may include at least one embedded processing system capable of synchronizing operations with predetermined time intervals also used by the surface system, receiving at least one copy of the acoustic signal from the surrounding rock formation, digitizing and storing of the received acoustic signals, and compression and transmission of at least some of the received acoustic signals to the surface system. In some embodiments, the surface subsystem may download or configure the predetermined time intervals within the downhole subsystem at the surface prior to entering the borehole 16 via a communication link (tethered or otherwise).

The digitized acoustic signals acquired during the predetermined time intervals are compressed. Digital waveform compression of received waveforms may be used with either LWD or MWD services for either or both storage and transmission. For storage, the waveform compression's utility lies in the ability to increase the storage density of a given finite FLASH memory, or other non-volatile memory. Thus, digital waveform compression may enable more recorded waveforms for either additional accuracy or for longer operation periods relative to a comparable LWD downhole apparatus without compression. For transmission, the waveform compression's utility focuses on increasing the throughput of digitized waveforms through a communication channel when transmitted to the surface systems in addition to any possible improved storage density. Thus, compression may enable timely transmission of digitized, received waveforms at an effective data rate that enables real-time SWD service and does not negatively impact other MWD services. For wireline systems, compression benefits are similar to L/MWD benefits with the possibility of additional waveform sampling densities, i.e. more waveforms per linear foot.

As an alternative to predetermined timing intervals, the shots (and recording intervals) may be event driven. For example, they may be actuated by commands from the surface computer system 66, which can be communicated via downlink telemetry or via cycling of the circulation pump between on and off states. As another example, the tinting may be set as part of the pump cycle. A pump cycle is where the surface mud pumps are cycled between off and on states, e.g. "on to off to on" is a full cycle.

The ability to detect these events may exist elsewhere in the L/MWD subsystem, and through an inter-tool communication system, the downhole SWD component receives a message indicating such an event occurred or a command to act in response to the event. In these embodiments, the downhole apparatus listens/monitor (receives) for trailing acoustic reflections off of surrounding rock formations, i.e. "echoes." The digital waveform compression of at least one digitized acoustic signal received facilitates either or both storage and/or transmission purposes.

The source 40 need not be on the surface, and in some contemplated embodiments, it is included as part of the drillstring. For example, the downhole seismic subsystems may further include a piezoelectric transducer such as those found in Halliburton's Acoustic Caliper™ and/or sonic (e.g., BAT™) downhole tools. The triggering of the downhole source corresponds with the timing of the recording intervals, e.g., in an event-driven fashion or at predetermined time intervals configured by the surface system prior to the downhole system entering into the borehole 16.

Figure 3:
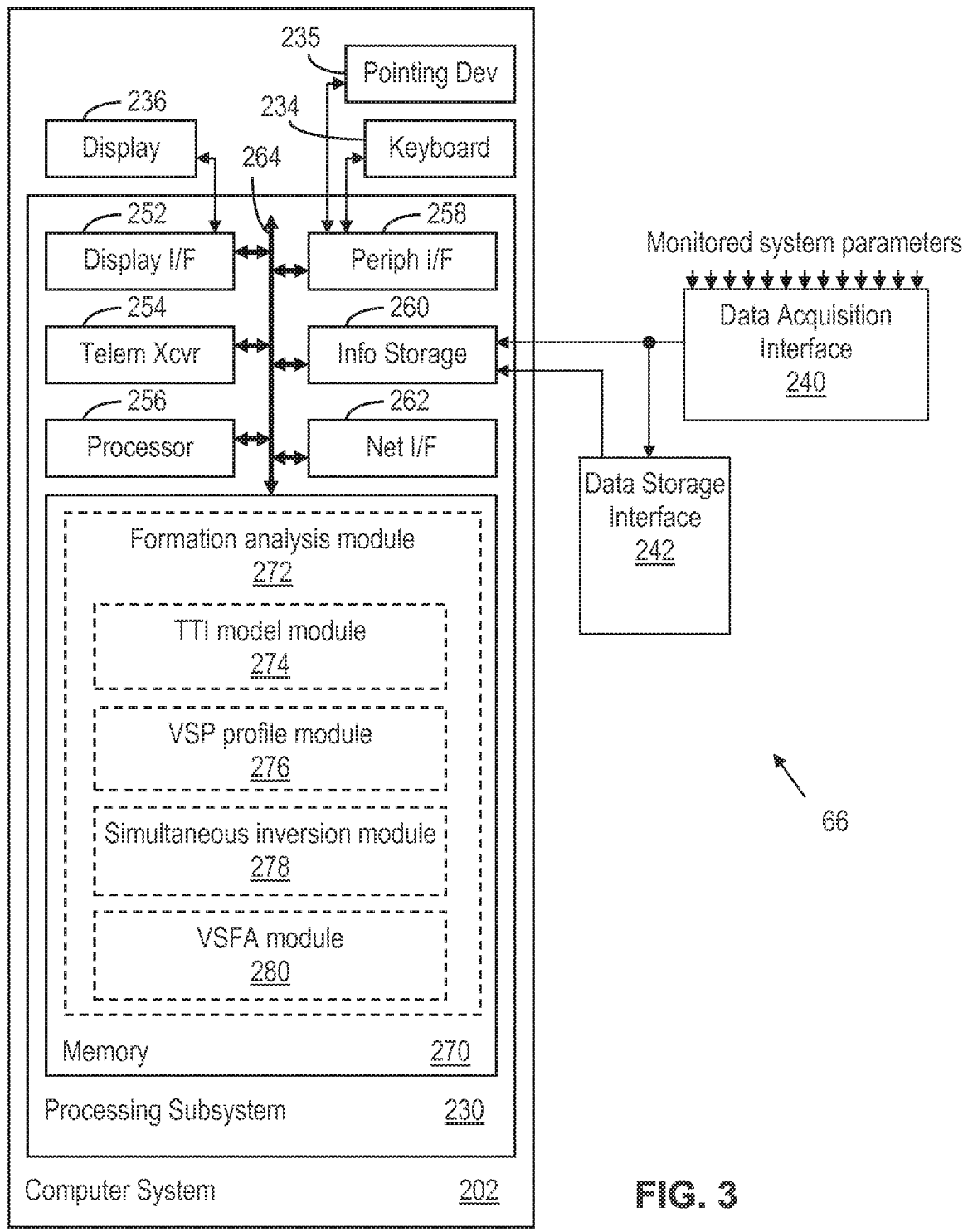
FIG. 3 shows illustrative components for the computer system of FIG. 2.

FIG. 3 shows illustrative components for the computer system 66 of FIG. 2. The illustrated components include a computer system 202 coupled to a data acquisition interface 240 and a data storage interface 242. In at least some embodiments, a user is able to interact with computer system 202 via keyboard 234 and pointing device 235 (e.g., a mouse) to perform the described seismology operations.

As shown, the computer system 202 comprises includes a processing subsystem 230 with a display interface 252, a telemetry transceiver 254, a processor 256, a peripheral interface 258, an information storage device 260, a network interface 262 and a memory 270. Bus 264 couples each of these elements to each other and transports their communications. In some embodiments, telemetry transceiver 254 enables the processing subsystem 230 to communicate with downhole and/or surface devices (either directly or indirectly), and network interface 262 enables communications with other systems (e.g., a central data processing facility via the Internet). In accordance with embodiments, user input received via pointing device 235, keyboard 234, and/or peripheral interface 258 are utilized by processor 256 to perform TTI model optimization operations as described herein. Further, instructions/data from memory 270, information storage device 260, and/or data storage interface 242 are utilized by processor 256 to analyze seismic data using a TTI model based on simultaneous inversion of $V_0$, $\varepsilon$, and $\delta$.

As shown, the memory 270 comprises a formation analysis module 272 that enables computer system 66 to perform various operations described herein including: TTI modeling; VSP profile management; simultaneous inversion of $V_0$ and the Thomsen parameters, $\varepsilon$ and $\delta$; and various VSFA operations. In some embodiments, the formation analysis module 272 performs a parameter estimation procedure composed of two steps: model setup and optimization. As previously mentioned, each layer of a 2D layered P-wave TTI velocity model is specified by five parameters: the layer depth, the anisotropic symmetry axis angle from the vertical direction, $V_0$, $\varepsilon$, and $\delta$. As used herein, a "layer" is a geological formation boundary that can be recognized or selected on a surface seismic migrated section. Usually each layer is a non-planar curve for a reservoir. Meanwhile, the "symmetry axis angle" is the angle from the vertical. In at least some embodiments, the symmetric axis angle is approximated from a surface seismic migrated section or other surveys, where $V_0$ is initiated using a check-shot velocity, and where $\varepsilon$ and $\delta$ are initiated as zeros.

More specifically, the formation analysis module 272 includes TTI model module 274, VSP profile module 276, simultaneous invention module 278, and VSFA module 280. The various software modules stored by memory 270 cause processor 256 to perform TTI model operations, VSP profile operations, simultaneous inversion operations, and VFSA operations as described herein. In at least some embodiments, the formation analysis module 272 causes the processor 256 to optimize a TTI model based on simultaneous inversion of $V_0$, $\varepsilon$, and $\delta$. Further, the formation analysis module 272 may cause the processor 256 to produce a seismic section from VSP walkaway data, select a first arrival pick from the seismic section, calculate a first arrival time as a travel time from a seismic source to a geophone through the TTI model, and determine values for $V_0$, $\varepsilon$, and $\delta$ by minimizing the difference between the first arrival pick and the calculated first arrival time. In some embodiments, the formation analysis module 272 may cause the processor 256 to perform simultaneous inversion operations using a VISA process with TTI model update criteria and termination criteria as described herein.

Further, in at least some embodiments, the formation analysis module 272 may cause the processor 256 to solve for a vector of unknowns during the VFSA process as described herein. Further, in at least some embodiments, the formation analysis module 272 may cause the processor 256 to apply an objective function during the VFSA process as described herein. Further, in at least some embodiments, the formation analysis module 272 may cause the processor 256 to apply a temperature cooling schedule during the VFSA process as described herein. Further, in at least some embodiments, the formation analysis module 272 may cause the processor 256 to generate a random variable to perturb the vector of unknowns during the VFSA process as described herein. Although the various modules 272, 274, 276, 278, and 280 are described as software modules executable by a processor (e.g., processor 256), it should be understood that comparable operations may be performed by programmable hardware modules, application-specific integrated circuits (ASICs), or other hardware.

Figure 4:
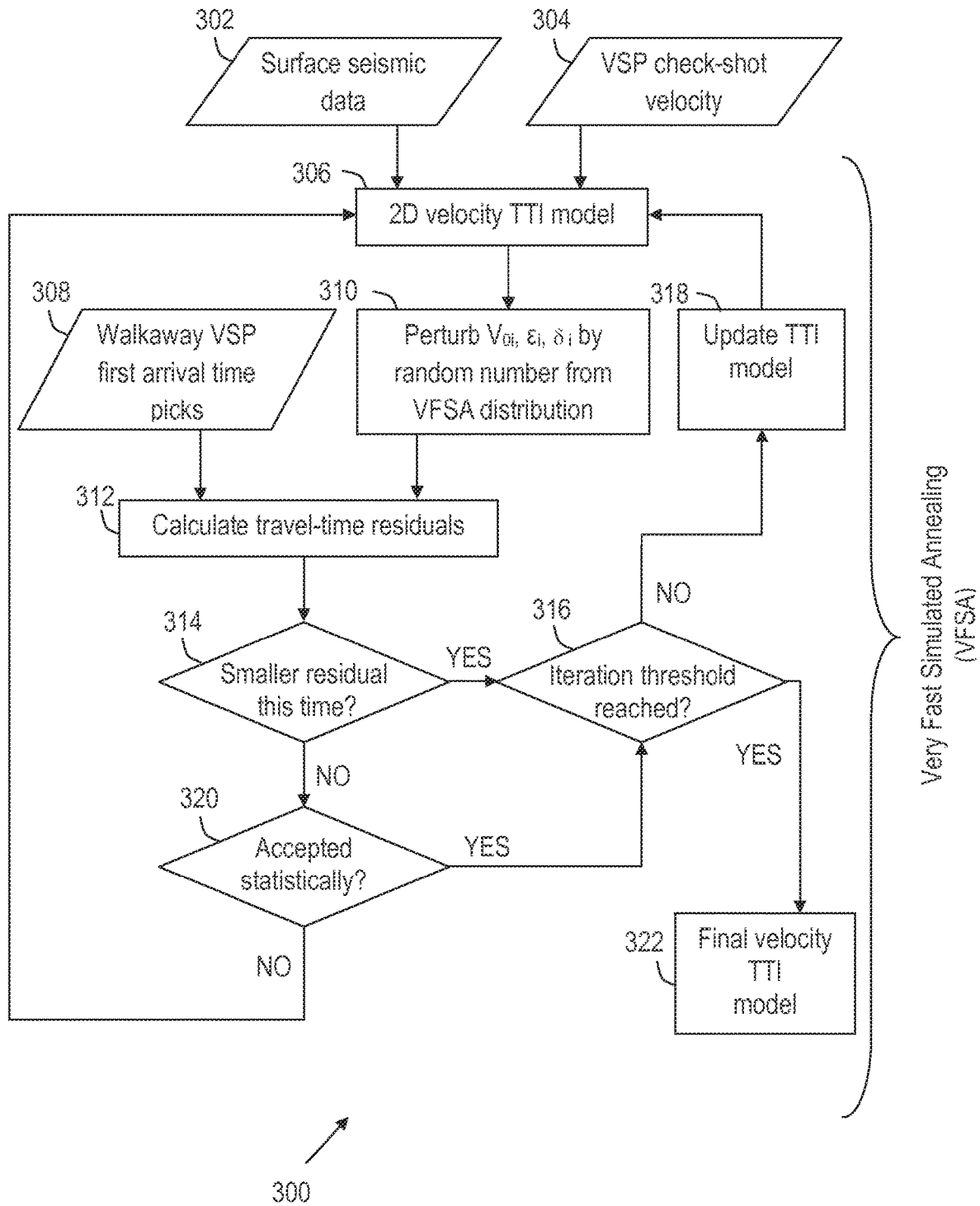
FIG. 4 shows an illustrative TTI model optimization process.

FIG. 4 shows an illustrative TTI model optimization process 300. In process 300, a 2D velocity TTI model 306 receives surface seismic data 302 and VSP check-shot velocity 304 as inputs. Using the TTI model 306, values for $V_{0i}$, $\varepsilon_i$, $\delta_i$ are perturbed by random numbers from a VFSA distribution at block 310. With the resulting values for $V_{0i}$, $\delta_i$, $\delta_i$ from block 310 and with walkaway VSP first arrival time picks 308, travel-time residuals are calculated at block 312. If the calculations of block 312 do not result in a smaller residual (determination block 314), a determination is made regarding whether the calculations are statistically acceptable (determination block 320). If not, the process returns to block 306. If the calculations of block 312 are statistically acceptable (determination block 320) or result in a smaller residual (determination block 314), a determination is made regarding whether an iteration threshold has been reached (determination block 316). If so, the velocity TTI model has been finalized (block 322). If the iteration threshold has not been reached (determination block 318), the TTI model is updated at block 318 and is used as the TTI model at block 306 for subsequent operations.

The operations of process 300 may be based, in part, on a system or vector of unknowns that the tomographic inversion is optimizing. For some embodiments of the disclosed operations, the vector of unknowns is:

$$X=(V_{0i},L,V_{0N},\delta_i,L,\delta_N,\varepsilon_i,L,\varepsilon_N)^T, \quad (1)$$

where N is the number of layers to be optimized; $V_{0i}$ is the P-wave velocity ($V_0$) along the symmetry axis for layer i; and $\delta_i$ and $\varepsilon_i$ are the Thomsen parameters $\delta$ and $\varepsilon$ for layer i. Further, the operations of process 200 may be based, in part, on an objective function:

$$E(X) = \sqrt{\frac{1}{R}\sum_{i=1}^{R}\left(t_i^{pick} - t_i^{cal}\right)^2}, \quad (2)$$

where R is the total number of arrival time picks; t is the direct arrival times; subscript i refer to the ith receiver; and superscripts pick and cal refer to picked and calculated times. Further, the operations of process 300 may be based, in part, on a temperature cooling schedule $T_k$:

$$T_k = T_0\exp(-ck^{1/(2M)}), \quad (3)$$

where $T_0$ is the initial temperature, c is a parameter to be used to control the temperature schedule and help tune the algorithm for a specific problem, k is the iteration number in the optimization, and M is the total number of unknowns. For this application, a suitable value for c is approximately 0.05 and for $T_0$ is 100.0. Further, the operations of process 300 may be based, in part, on generation of a random variable u to perturb the X vector. Considering an unknown $x_i^k$ generated at annealing iteration k, $x_i^k$ can be updated to $x_i^{k+1}$ as:

$$x_i^{k+1} = x_i^k + q(x_i^{max} - x_i^{min}), \quad (4)$$

where q is a random number and $x_i^{min}$ and $x_i^{max}$ are bounds for the unknowns of layer i, which is constrained by $x_i\varepsilon[x_i^{min}, x_i^{max}]$. The random variable q is generated from a uniformly distributed random number u between zero and one ($u\varepsilon U[0,1]$) by the formula:

$$q = sgn(u-0.5)T_k[(1+1/T_k)^{|2u-1|} - 1] \quad (5)$$

where sgn is the sign function. The random variable lies between −1 and 1 ($q\varepsilon[-1,1]$) and guarantees the convergence of VFSA.

Further, the operations of process 300 may be based, in part, on iteration termination criteria. In at least some embodiments, the termination criteria of the annealing process are arbitrary. Reasonable constraints are that the misfit (residuals) remains the same for a number of iterations for temperature T close to zero, that the misfit is smaller than a user-specified value, and that the total iteration number exceeds the user-specified maximum iteration. The process of applying the VFSA technique can thus be halted when any one of these criteria is met, yielding the desired anisotropy parameters.

Further, the operations of process 300 may be based, in part, on an accurate and efficient TTI ray tracer. In at least some embodiments, the shooting method is implemented to provide two-point seismic ray tracing in the TTI media. In the shooting method, a ray is shot from a source location with a given shooting direction. Then the shooting direction is modified until the ray emerges at the desired receiver location. Once the raypath is determined, the seismic travel-times are calculated by integrating the product of slowness and raypath segment length along the path using layer group slowness.

Figure 5A:
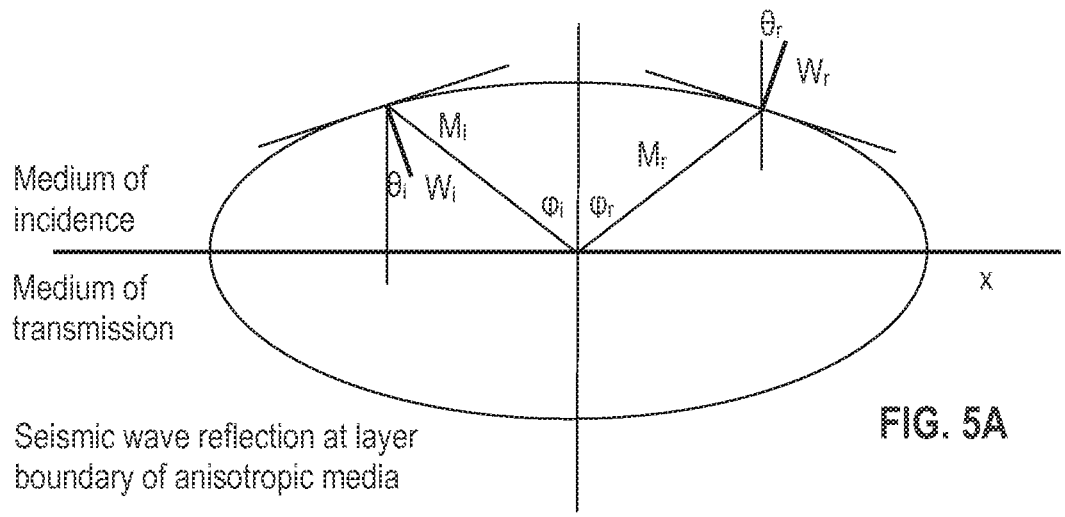
FIGS. 5A and 5B show illustrative reflection/transmission angles of slowness vectors in an anisotropic medium.
Figure 5B:
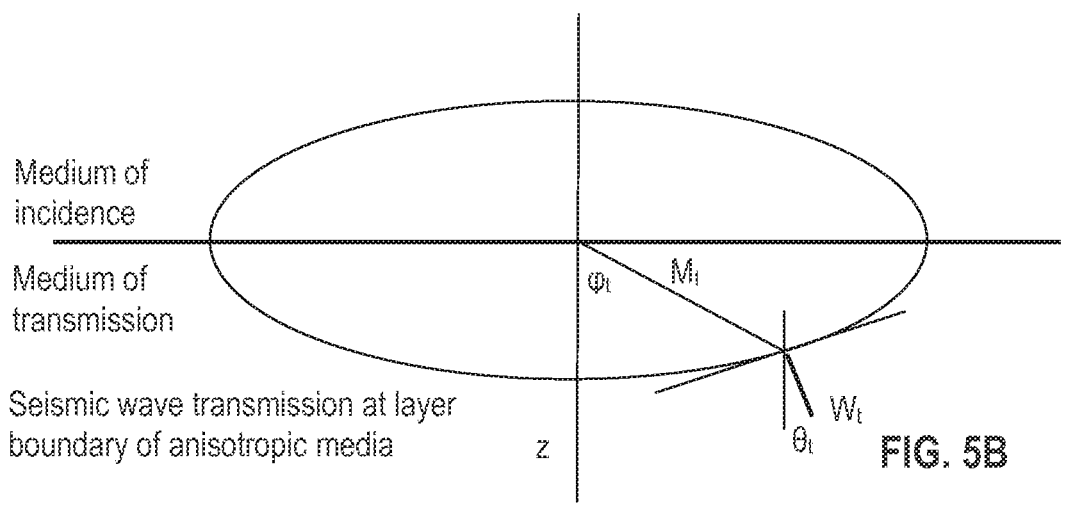

A complete raypath is governed by kinematic seismic ray equations with appropriate application of Snell's law in the presence of any interface to be traced. In an anisotropic medium, the key element is the phase slowness analysis at each layer interface. FIGS. 5A and 5B show illustrative reflection/transmission angles of slowness vectors in an anisotropic medium. In FIGS. 5A and 5I, a ray is incident on the boundary from above, and phase-slowness vectors (for incident, reflected, and transmitted waves) are coplanar. Denoting the phase slowness vector as M, the continuity conditions require that $$M_i \cdot X = M_r \cdot X = M_t \cdot X, \quad (6)$$

where X is the unit vector in the x-direction and subscripts i, r, t refer to incident, reflected, and transmitted waves, respectively. The group slowness vector W is normal to the phase slowness surface. In FIGS. 5A and 5B, the curves represent phase slowness in the medium of incidence and transmission, and the Cartesian axes x and z correspond to the horizontal and vertical slowness, respectively. In other words, the curves illustrate the angles for incident, reflected, and transmitted rays in anisotropic media separated by a horizontal, planar interface using phase-slowness surface. The M vectors correspond to phase-slowness and W vectors to group-slowness; theta ($\theta$) and phi ($\varphi$) correspond to ray/group angle and phase angle, respectively for incident, reflected, and transmitted waves. Note that $\theta_i \neq \varphi_i, \theta_r \neq \varphi_r, \theta_t \neq \varphi_t$ for an anisotropic model such as the TTI model described herein. Once the raypath is determined by the phase slowness analysis, the seismic traveltimes are calculated by integrating the product of slowness and raypath segment length along the path using layer group slowness.

Figure 6:
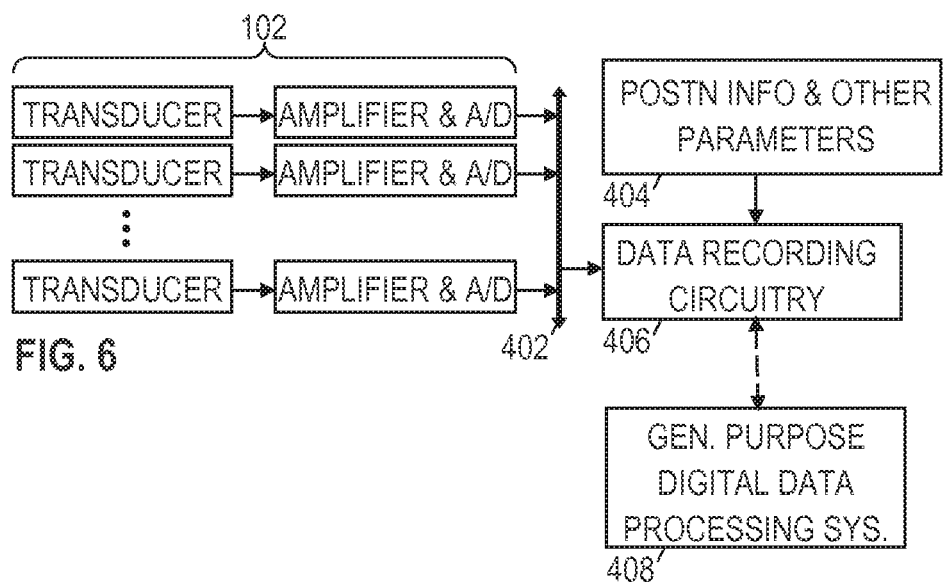
FIG. 6 shows an illustrative seismic survey recording system.

FIG. 6 shows an illustrative seismic survey recording system having the receivers 102 coupled to a bus 402 to communicate digital signals to data recording circuitry 406. Position information sensors 404 (and optionally sensors for other parameters) are also coupled to the data recording circuitry 406 to enable the data recording circuitry to store additional information useful for interpreting the recorded data. Illustratively, such additional information can include source waveform characteristics, digitization settings, detected faults in the system, etc.

Figure 7:
FIG. 7 shows illustrative seismic traces.

Recording circuitry 406 acquires the high speed data stream(s) from receivers 102 onto a nonvolatile storage medium such as a storage array of optical or magnetic disks. The data is stored in the form of (possibly compressed) seismic traces, each trace being the signal detected and sampled by a given receiver in response to a given shot. (The associated shot and receiver positions are also stored.) Illustrative seismic signals are shown in FIG. 7. The signals indicate some measure of seismic wave energy as a function of time (e.g., displacement, velocity, acceleration, pressure), and they are digitized at high resolution (e.g., 16 to 32 bits) at a programmable sampling rate (e.g., 400 to 100 Hz) for a fixed duration after each shot (e.g., 30 seconds). Such signals can be grouped in different ways, and when so grouped, they are called a "gather". For example, a "common midpoint gather" is the group of traces that have a midpoint within a defined region. A "shot gather" is the group of traces recorded for a single firing of the seismic source.

A general purpose data processing system 408 receives the acquired seismic survey data from the data recording circuitry 406. In some cases the general purpose data processing system 408 is physically coupled to the data recording circuitry and provides a way to configure the recording circuitry and perform preliminary processing in the field. More typically, however, the general purpose data processing system is located at a central computing facility with adequate computing resources for intensive processing. The survey data can be transported to the central facility on physical media or communicated via a computer network. Processing system 408 includes a user interface having a graphical display and a keyboard or other method of accepting user input and/or enabling users to view and analyze the subsurface structure images derived from collected seismic survey data.

Figure 8:
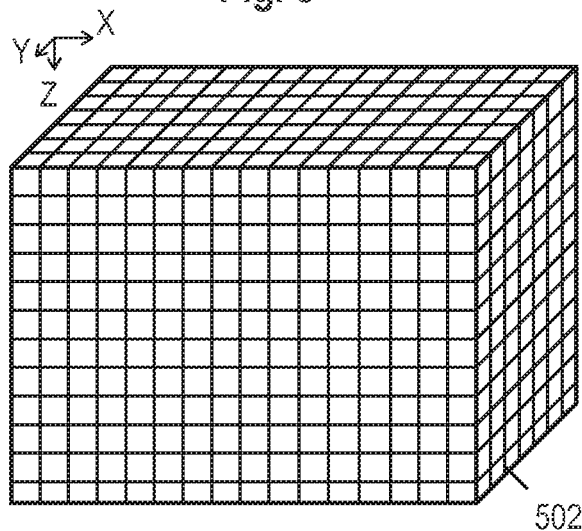
FIG. 8 shows an illustrative data volume in three dimensions.

The recorded seismic survey data is of little use when maintained in the format of FIG. 7. Although it is possible to plot the various recorded waveforms side by side in a plot that reveals large scale subsurface structures, such structures are distorted and finer structures cannot even be seen. Hence the data is processed to create a data volume, i.e., a three dimensional array of data values such as that shown in FIG. 8. The data volume represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format readily lends itself to computational analysis and visual rendering, and for this reason, the data volume may be termed a "three-dimensional image" of the survey region.

Figure 9:
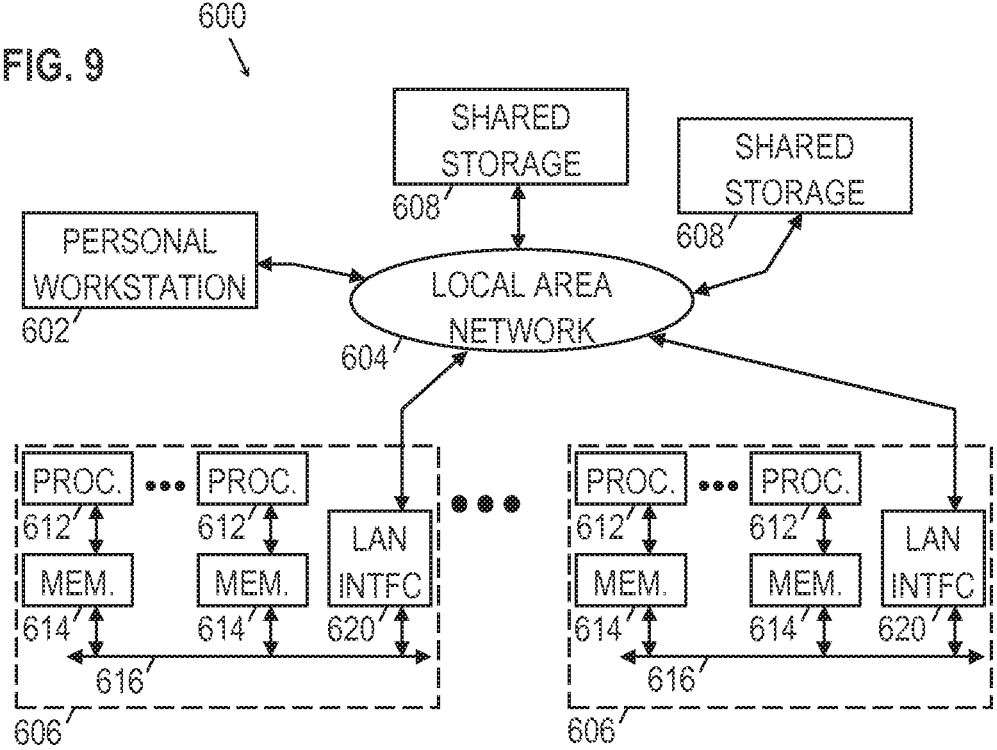
FIG. 9 shows an illustrative imaging system.

FIG. 9 shows an illustrative computer system 600 for performing seismic data processing using a TTI model obtained by simultaneous inversion of $V_0$ and the Thomsen parameters, $\varepsilon$ and $\delta$, as described herein. A personal workstation 602 is coupled via a local area network (LAN) 604 to one or more multi-processor computers 606, which are in turn coupled via the LAN to one or more shared storage units 608. Personal workstation 602 serves as a user interface to the processing system, enabling a user to load survey data into the system, to retrieve and view image data from the system, and to configure and monitor the operation of the processing system. Personal workstation 602 may take the form of a desktop computer with a graphical display that graphically shows survey data and images of the survey region, and with a keyboard that enables the user to move files and execute processing software.

LAN 604 provides high-speed communication between multi-processor computers 606 and with personal workstation 602. The LAN 604 may take the form of an Ethernet network. Meanwhile, multi-processor computer(s) 606 provide parallel processing capability to enable suitably prompt conversion of seismic trace signals into a survey region image. Each computer 606 includes multiple processors 612, distributed memory 614, an internal bus 616, and a LAN interface 620. Each processor 612 operates on an allocated portion of the input data to produce a partial image of the seismic survey region. Associated with each processor 612 is a distributed memory module 614 that stores conversion software and a working data set for the processor's use. Internal bus 616 provides inter-processor communication and communication to the LAN networks via interface 620. Communication between processors in different computers 606 can be provided by LAN 604.

Shared storage units 608 may be large, stand-alone information storage units that employ magnetic disk media for nonvolatile data storage. To improve data access speed and reliability, the shared storage units 608 may be configured as a redundant disk array. Shared storage units 608 initially store a velocity data volume and shot gathers from a seismic survey. The illumination matrix values and/or reflectivity image volumes can be stored on shared storage units 608 for later processing. In response to a request from the workstation 602, the image volume data can be retrieved by computers 606 and supplied to workstation for conversion to a graphical image to be displayed to a user.

Figure 10:
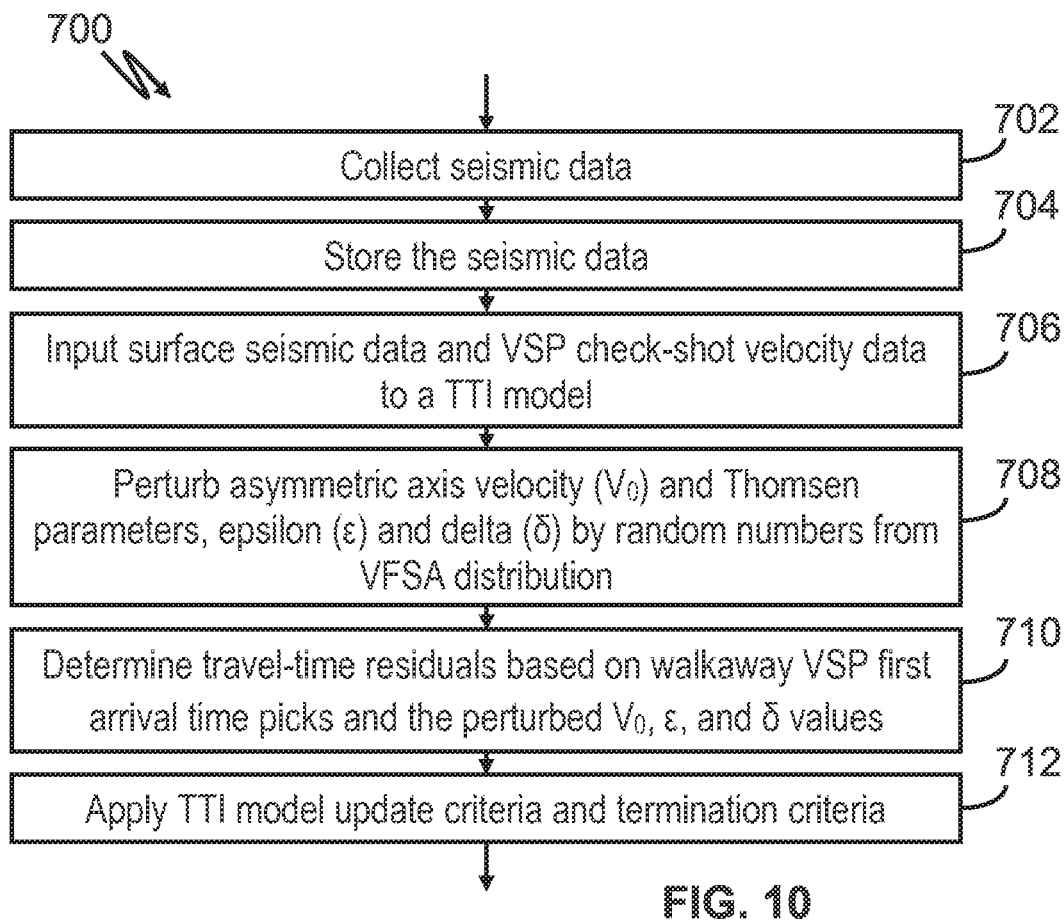
FIG. 10 shows an illustrative seismology method.

FIG. 10 shows an illustrative seismology method 700 that includes collecting seismic data (block 702). At block 704, the seismic data is stored. At block 706, surface seismic data and VSP check-shot velocity data are input to a TTI model. At block 708, $V_0$, $\varepsilon$, and $\delta$ are perturbed by random numbers from a VFSA distribution. At block 710, travel-time residuals are determined based on walkaway VSP first arrival time picks and the perturbed $V_0$, $\varepsilon$, and $\delta$ values. At block 712, TTI model update criteria and termination criteria are applied. Examples of TTI model update criteria includes updating the TTI model if the residuals for an iteration are smaller than the previous iteration or updating the IT model if the residuals are statistically acceptable. Examples of termination criteria include the residuals remaining the same for a number of iterations for temperature T close to zero, the residuals being smaller than a threshold value, and/or the total iteration number exceeding a threshold number of iterations. The seismology method 700 may be performed by computing components of computer system 66, computer system 202, or other computing components described herein.

In some embodiments, the method 700 includes additional or alternative steps. For example, method 700 may analyze collected seismic data using a TTI model based on simultaneous inversion of $V_0$, $\varepsilon$, and $\delta$. The method 700 also may include related steps such as determining values for $V_0$, $\varepsilon$, and $\delta$ by minimizing the difference between a first arrival pick and a calculated first arrival time. Further, the method 700 may include receiving VSP walkaway data and using the VSP walkaway data to minimize the difference between the first arrival pick and the calculated first arrival time. Further, the method 700 may include producing a seismic section from the VSP walkaway data, selecting the first arrival pick from the seismic section, and calculating the first arrival time as a travel time from a seismic source to a geophone through the TTI model. Further, the method 700 may include applying a VFSA process to perform the simultaneous inversion. Further, the method 700 may include applying, during the VFSA process, an objective function, a temperature cooling schedule, and generation of a random variable to perturb values for $V_0$, $\varepsilon$, and $\delta$.

Figure 11:
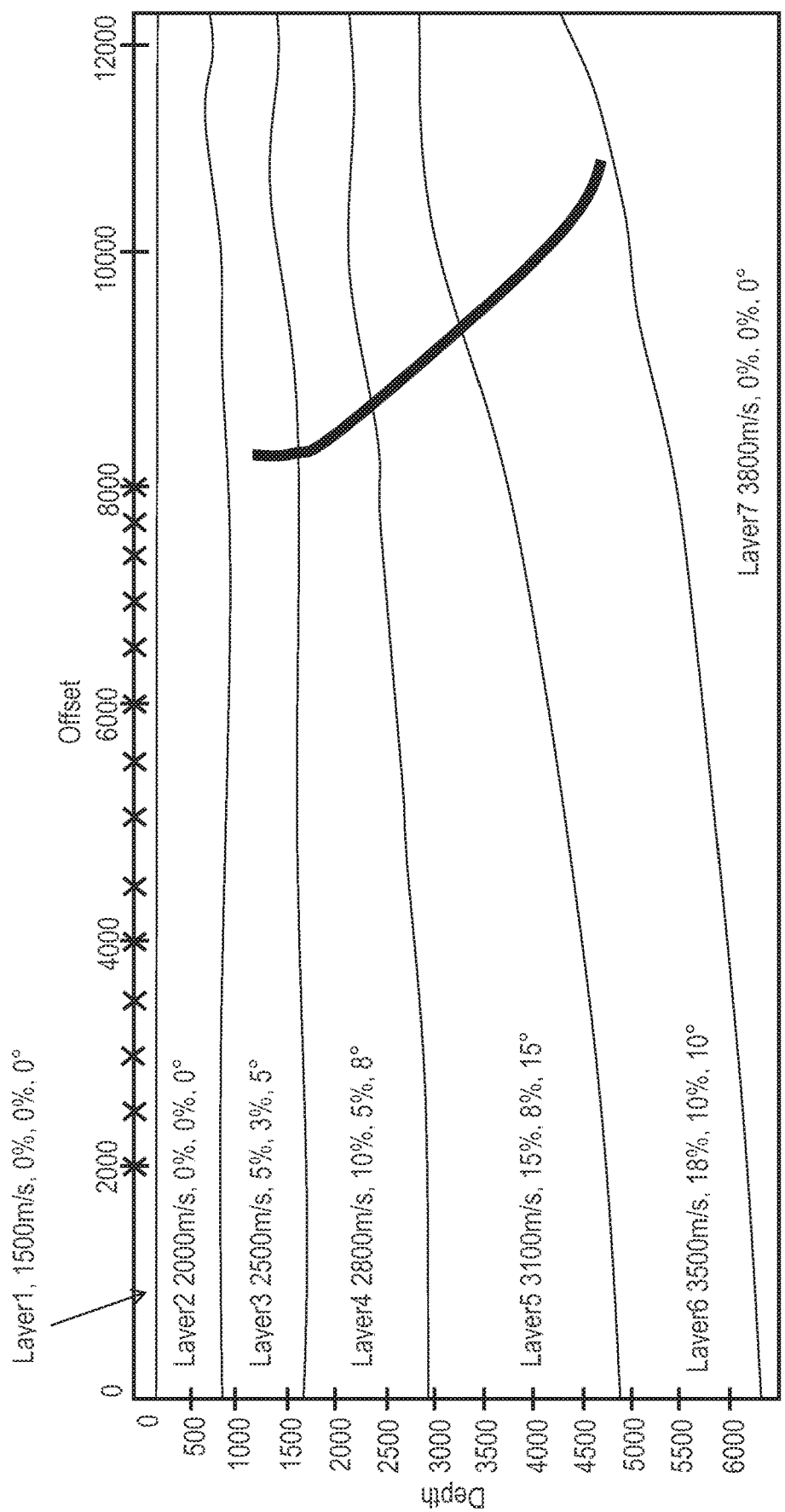
FIG. 11 shows an illustrative synthetic model and seismic survey geometry.

The tomographic inversion described herein is testable using a synthetic walkaway survey. FIG. 11 shows an illustrative synthetic model and seismic survey geometry composed of seven layers (Layer1-Layer7). The top layer is ocean water. The information shown for each layer includes a layer number, $V_0$, $\varepsilon$, $\delta$, and a tilted angle of the symmetric axis. These layer properties may vary for different layers. In the example Layer1, $V_0$=1500 m/s, $\varepsilon$=0%, $\delta$=0%, and the tilted angle of the symmetric axis=0°. In the example Layer2, $V_0$=2000 m/s, $\varepsilon$=0%, $\delta$=0%, and the tilted angle of the symmetric axis=0°. In the example Layer3, $V_0$=2500 m/s, $\varepsilon$=5%, $\delta$=3%, and the tilted angle of the symmetric axis=5°. In the example Layer4, $V_0$=2800 m/s, $\varepsilon$=10%, $\delta$=5%, and the tilted angle of the symmetric axis=8°. In the example Layer5, $V_0$=3100 m/s, $\varepsilon$=15%, $\delta$=8%, and the tilted angle of the symmetric axis=15°. In the example Layer6, $V_0$=3500 m/s, $\varepsilon$=18%, $\delta$=10%, and the tilted angle of the symmetric axis=10°. In the example Layer7, $V_0$=3800 m/s, $\varepsilon$=0%, $\delta$=0%, and the tilted angle of the symmetric axis=0°.

In FIG. 11, the synthetic walkaway survey is composed of 14 shots on the surface and 300 receivers along the deviated wellbore (not shown in FIG. 11). Further, shot spacing increases as a function of distance from the wellhead (i.e., the shot spacing near the wellhead is less than the shot spacing far away from the wellhead). The ratio of maximum shot offset to maximum receiver depth is limited to around one to avoid header wave and other interfering waves.

Figure 12:
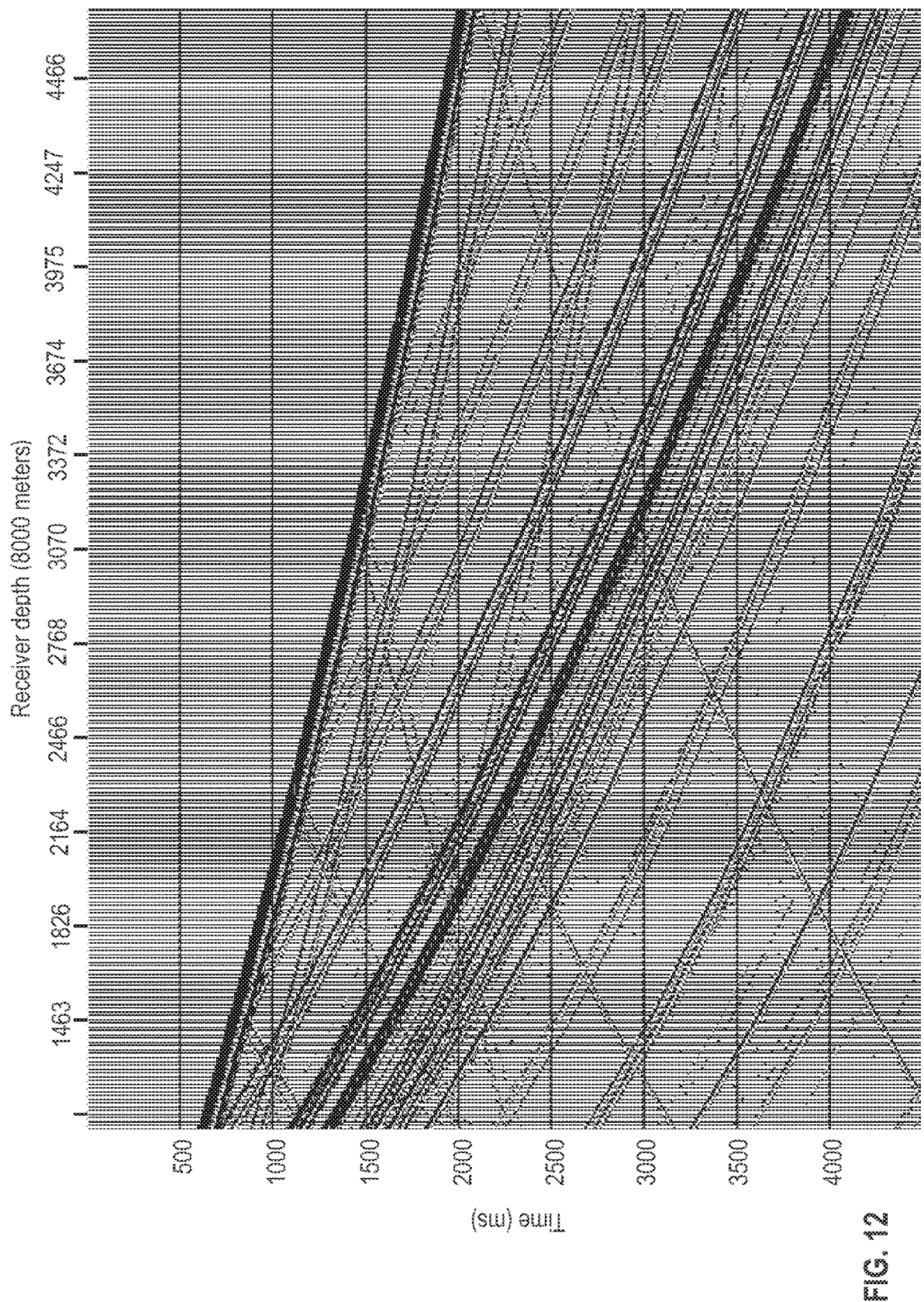
FIG. 12 shows an illustrative synthetic waveform of zero offset shot generated by finite difference modeling.

To obtain check-shot velocity, finite difference forward modeling is conducted with a maximum frequency of 75 Hz for the zero offset shot (the nearest one to the wellhead). FIG. 12 shows an illustrative synthetic waveform of zero offset shot generated by finite difference modeling. In FIG. 12, the first arrivals are accurately picked (the top line) and are used to generate a check-shot velocity profile which is used as initial velocities for the tomographic inversion.

Figure 13:
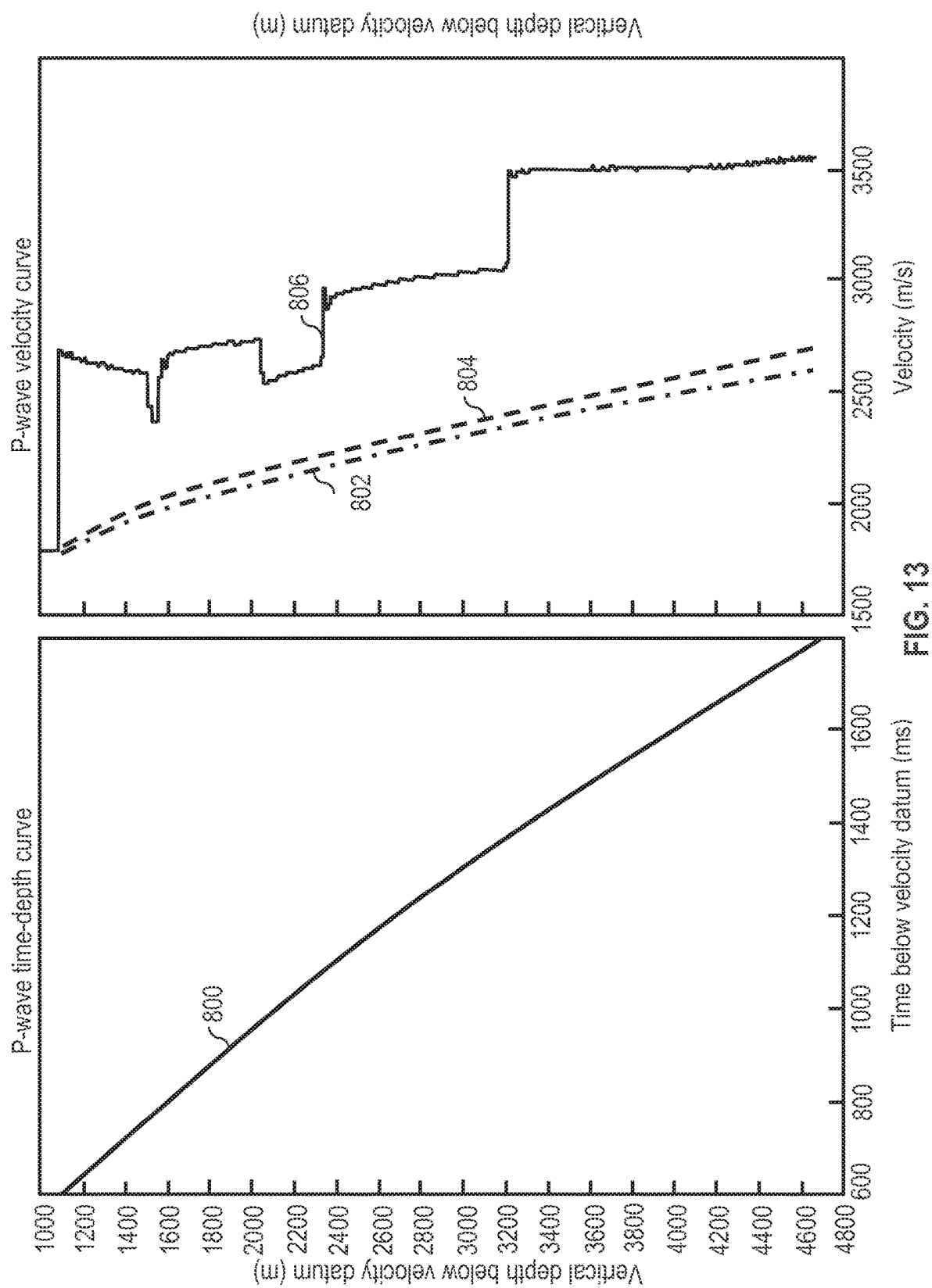
FIG. 13 shows illustrative P-wave time-depth and velocity curves.

The synthetic waveforms were then loaded into a processing system to generate a check-shot velocity profile which shows velocity jumps at depths around 1500 m, 2300 m, and 3200 m (see FIG. 13). These velocity jumps correspond to the intersection depths between the wellbore and layers 3, 4, and 5. Since the check-shot velocity is accurate for layers in which receivers are placed, $V_0$, $\varepsilon$ and $\delta$ were fixed as their true values for layers 1, 2, and 7 during tomographic inversion. In FIG. 13, the left-side graph shows a traveltime (x-axis) vesus depth (z-axis) curve 800, and the right-side graph shows three velocity (x-axis) vesus depth (z-axis) curves 802, 804, and 806. More specifically, curve 802 is the average velocity, curve 804 is the RMS velocity, and curve 806 is the interval velocity. In some embodiments, the interval velocity is used as the initial velocity for the TTI model.

In the disclosed tomographic inversion, an appropriate value range for $V_0$, $\varepsilon$ and $\delta$ is set for each layer. The range will be used to constrain the unknowns during random perturbation of the TTI model. Values that fall within the range are possible candidates during model updates. Table 1 shows a list of initial values for the TTI model and search ranges of unknowns. The ranges are defined by table columns of the minimum values and the maximum values.

The initial velocity value in Table 1 is the average from the interval velocity curve 806 of the check-shot velocity profile (FIG. 13). The expected velocity along the symmetry axis would not deviate too much from ones along vertical axis. Therefore, the velocity range is set as a narrow range (columns 5 and 8 in Table 1). For anisotropic parameters, the initial values are set to zero. Based on the regional geology and estimates from seismic data, the range for $\varepsilon$ and $\delta$ (column 6 and 9 for $\delta$, column 7 and 10 for $\varepsilon$, Table 1) are set.

TABLE 1

| Layer | Initial Values | | | Minimum Values | | | Maximum Values | | |
|---|---|---|---|---|---|---|---|---|---|
| | $V_0$ | $\delta$(%) | $\varepsilon$(%) | $V_0$ | $\delta$(%) | $\varepsilon$(%) | $V_0$ | $\delta$(%) | $\varepsilon$(%) |
| 3 | 2600 | 0 | 0 | 2100 | 0 | 0 | 3100 | 5 | 10 |
| 4 | 2700 | 0 | 0 | 2200 | 0 | 5 | 3200 | 10 | 15 |
| 5 | 3000 | 0 | 0 | 2500 | 5 | 10 | 3500 | 15 | 20 |
| 6 | 3500 | 0 | 0 | 3000 | 5 | 10 | 4000 | 15 | 20 |

TABLE 2

| Layer | True Values | | | Inverted Values | | | Error Percentage (%) | | |
|---|---|---|---|---|---|---|---|---|---|
| | $V_0$ | $\delta$(%) | $\varepsilon$(%) | $V_0$ | $\delta$(%) | $\varepsilon$(%) | $V_0$ | $\delta$ | $\varepsilon$ |
| 3 | 2500 | 3 | 5 | 2432 | 2.81 | 4.84 | -2.7 | -6.3 | -3.2 |
| 4 | 2800 | 5 | 10 | 2712 | 5.64 | 9.23 | -3.1 | 12.8 | -7.7 |
| 5 | 3100 | 8 | 15 | 3191 | 7.13 | 16.02 | 2.9 | -10.9 | 6.8 |
| 6 | 3500 | 10 | 18 | 3433 | 10.67 | 19.14 | -1.9 | 6.7 | 6.3 |

Tomographic inversion begins with initial values and ranges listed in Table 1. After several trials of VFSA, suitable values can be determined (e.g., c=0.05, $T_0$=100.0, and total iteration=2000). The final inverted model has a 3.8 ins RMS error as shown in Table 2 which lists true values, inverted values, and error percentages (the difference between the true and the inverted values divided by the true values).

Table 2 entries illustrate that the velocity is well inverted with maximum error percentage of 3.1%. The inverted epsilon ε is close to the true value with maximum error percentage of 7.7%. The inverted delta δ has larger error percentage (12.8%), but the absolute difference is only 0.87%. The absolute difference for the inverted E is small as well, only 1.14%.

As described herein, TTI tomographic inversion operates to determine the optimal $V_0$, ε, and δ by minimizing the difference between first arrival picks and the calculated first arrival times. The VFSA method is used as the parameter estimation engine. As disclosed herein, the VFSA method statistically perturbs the model (by adjusting $V_0$, ε, and δ of each layer) and makes statistical decisions on discarding or accepting the perturbed model.

Compared with many linear or linearized inversions, VFSA has shown a superior performance and enables global minimum inversion. The final results yielded by VFSA do not depend on the initial models used for the inversion. It has been successfully used in many geophysical inversion problems. However, there is no mathematic formula to select suitable parameter values for c, $T_0$, and total iteration. These parameters control the model space where VFSA searches for the best fits and the model space is problem-dependent. The rule of thumb is to do trial runs to find suitable values of these parameters for the specific problem. Once determined, these parameters stay fixed. For the disclosed synthetic examples, c=0.05, $T_0$=100.0, and total iteration=2000 based on several trials.

The test with noise-free synthetics indicates that both velocity and anisotropic parameters are well recovered. It is important to be aware that noise level in real data may contaminate the final inverted results. In addition, the uncertainty of first arrival picks may increase uncertainty of the final inverted results.

Numerous other modifications, equivalents, and alternatives, will become apparent to those skilled in the art once the above disclosure is fully appreciated. For example, although at least some software embodiments have been described as including modules performing specific functions, other embodiments may include software modules that combine the functions of the modules described herein. Also, it is anticipated that as computer system performance increases, it may be possible in the future to implement the above-described software-based embodiments using much smaller hardware, making it possible to perform the described non-physical attribute management operations using on-site systems (e.g., systems operated within a well-logging truck located at the reservoir). Additionally, although at least some elements of the embodiments of the present disclosure are described within the context of monitoring real-time data, systems that use previously recorded data (e.g., "data playback" systems) and/or simulated data (e.g., training simulators) are also within the scope of the disclosure. It is intended that the following claims be interpreted to embrace all such modifications, equivalents, and alternatives where applicable.

What is claimed is:

1. A seismic data analysis system, comprising:
   a logging tool suite including one or more seismic receivers that gather seismic data from a plurality of positions in a borehole that penetrates an anisotropic formation;
   memory that stores the seismic data; and
   logic that analyzes the seismic data using a tilted transversely isotropic (TTI) model that is optimized based on simultaneous inversion of asymmetric axis velocity ($V_0$) and Thomsen parameters, epsilon (ε) and delta (δ), the simultaneous inversion of the $V_0$, the ε, and the δ including applying a Very Fast Simulated Annealing (VFSA) process to values for the $V_0$, the ε, and the δ, wherein the logic determines the values for the $V_0$, the ε, and the δ by minimizing a difference between a first arrival pick and a calculated first arrival time, and wherein the logic receives Vertical Seismic Profiling (VSP) walkaway data and uses the VSP walkaway data to minimize the difference between the first arrival pick and the calculated first arrival time.

2. The seismic data analysis system of claim 1, further comprising a user interface that displays the TTI model.

3. The seismic data analysis system of claim 1, wherein the logic produces a seismic section from the VSP walkaway data, wherein the first arrival pick is selected from the seismic section, and wherein the calculated first arrival time corresponds to a travel time from a seismic source to the one or more seismic receiver through the TTI model.

4. The seismic data analysis system of claim 1, wherein the VFSA process is applied with TTI model update criteria and termination criteria to optimize the TTI model.

5. The seismic data analysis system of claim 1, wherein the VFSA process uses an objective function, a temperature cooling schedule, and generation of a random variable to perturb the values for the $V_0$, the ε, and the δ.

6. The seismic data analysis system of claim 1, wherein the VFSA process terminates in response to a misfit that does not vary for a predetermined number of iterations or in response to a number of iterations reaching a predetermined threshold.

7. The seismic data analysis system of claim 1, wherein the VFSA process terminates in response to a misfit that is smaller than a predetermined value.

8. The seismic data analysis system of claim 1, wherein the logic is part of the logging tool suite that includes the memory.

9. The seismic data analysis system of claim 1, wherein the logic is part of a surface computer in communication with the logging tool suite.

10. A method for seismic data analysis, comprising:
    operating one or more seismic receivers of a logging tool suite that gather seismic data from a plurality of positions in a borehole that penetrates an anisotropic formation;
    retrieving the seismic data from the seismic receivers;
    receiving Vertical Seismic Profiling (VSP) walkaway data;
    determining values for an asymmetric axis velocity ($V_0$) and Thomsen parameters, epsilon (ε) and delta (δ) by minimizing a difference between a first arrival pick and a calculated first arrival time using the VSP walkaway data;
    optimizing a tilted transversely isotropic (TTI) model based on simultaneous inversion of the $V_0$, the ε, and the δ, the simultaneous inversion of the $V_0$, the ε, and the δ including applying a Very Fast Simulated Annealing (VFSA) process to the values for the $V_0$, the ε, and the δ;
    analyzing the seismic data using the TTI model; and
    displaying a representation of the anisotropic formation based on the analyzed seismic data.

11. The method of claim 10, further comprising producing a seismic section from the VSP walkaway data, selecting the first arrival pick from the seismic section, and calculating the first arrival time as a travel time from a seismic source to the one or more seismic receiver through the TTI model.

12. The method of claim 11, further comprising applying the VFSA process with TTI model update criteria and termination criteria to optimize the TTI model.

13. The method of claim 11, further comprising applying to the VFSA process an objective function, a temperature cooling schedule, and generation of a random variable to perturb the values for the $V_0$, the $\varepsilon$, and the $\delta$.

14. A non-transitory computer-readable medium storing seismic data analysis software that, when executed, causes one or more processors to:
   produce a seismic section from Vertical Seismic Profiling (VSP) walkaway data;
   select a first arrival pick from the seismic section;
   calculate a first arrival time as a travel time from a seismic source to the one or more seismic receiver through a tilted transversely isotropic (TTI) model;
   determine values for an asymmetric axis velocity ($V_0$) and Thomsen parameters, epsilon ($\varepsilon$) and delta ($\delta$) by minimizing a difference between the first arrival pick and the calculated first arrival time;
   optimize the TTI model based on simultaneous inversion of the $V_0$, the $c$, and the $\delta$, the simultaneous inversion of the $V_0$, the $\varepsilon$, and the $\delta$ including applying a Very Fast Simulated Annealing (VFSA) process to the values for the $V_0$, the $\varepsilon$, and the $\delta$;
   use the TTI model to analyze seismic data from one or more seismic receivers of a logging tool suite that gather the seismic data from a plurality of positions in a borehole that penetrates an anisotropic formation; and
   display a representation of the anisotropic formation based on the analyzed seismic data.

15. The non-transitory computer-readable medium of claim 14, wherein the seismic data analysis software, when executed, further causes the one or more processors to perform the simultaneous inversion using the VFSA process with TTI model update criteria and termination criteria.

16. The non-transitory computer-readable medium of claim 15, wherein the one or more processors are part of a surface computer in communication with the logging tool suite that includes the one or more seismic receivers.

* * * * *

UNITED STATES PATENT AND TRADEMARK OFFICE
CERTIFICATE OF CORRECTION

PATENT NO. : 10,768,323 B2　　　　　　　　　　　　　　　　　　　Page 1 of 1
APPLICATION NO. : 14/760142
DATED : September 8, 2020
INVENTOR(S) : Donghong Pei, Robert Jason Gibbs and Ran Zhou It is certified that error appears in the above-identified patent and that said Letters Patent is hereby corrected as shown below:

In the Specification

In Column 3, Line 33, after --TTI-- delete "formulation" and insert --formation--

Signed and Sealed this
Third Day of November, 2020

Andrei Iancu
*Director of the United States Patent and Trademark Office*